Nov. 5, 1974      H. R. HAY      3,846,251
APPARATUS FOR SOLAR DISTILLATION
Filed March 2, 1971
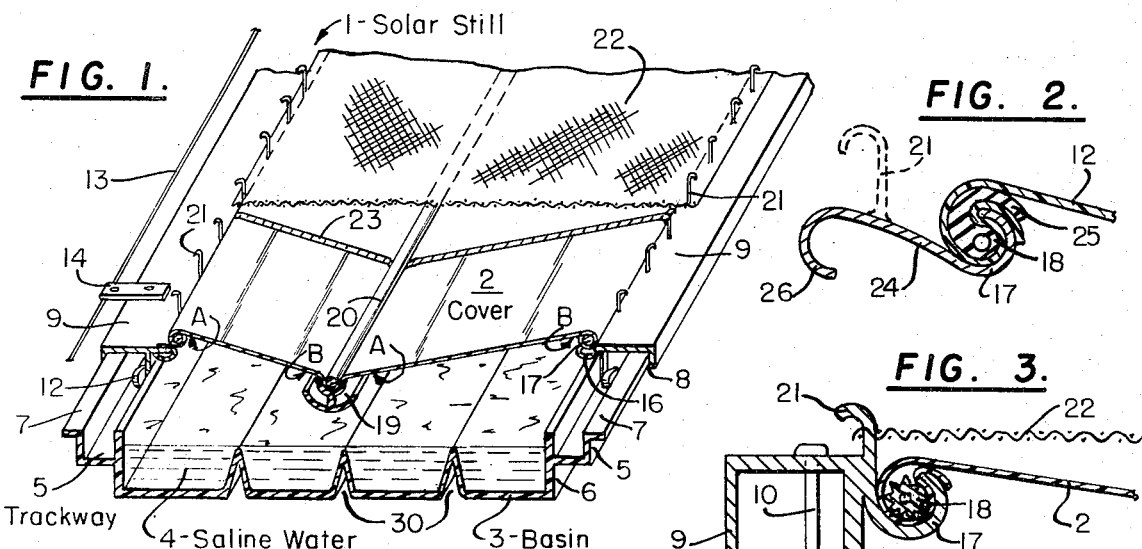
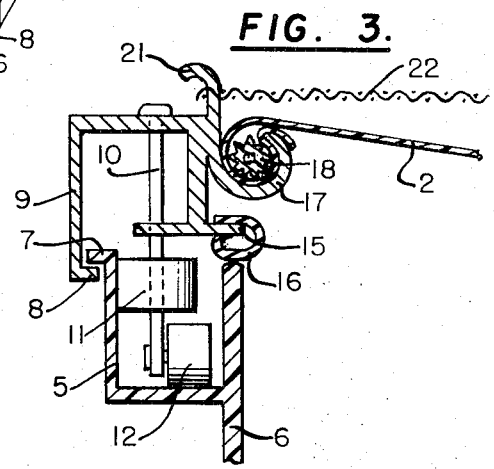
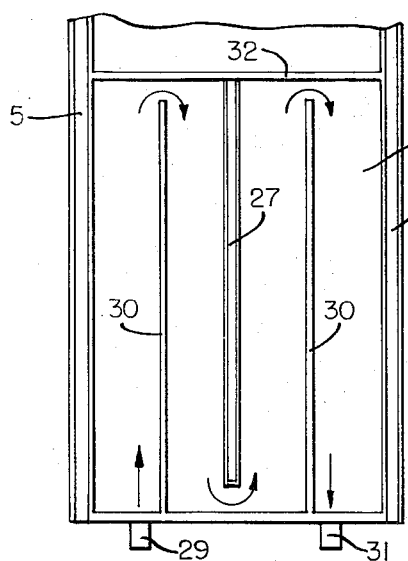
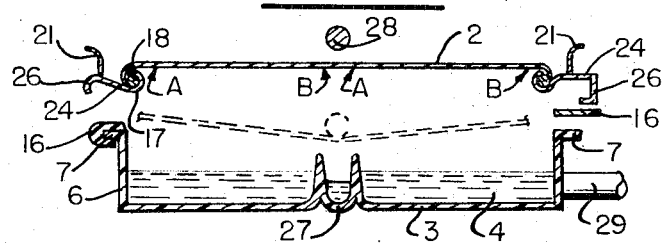
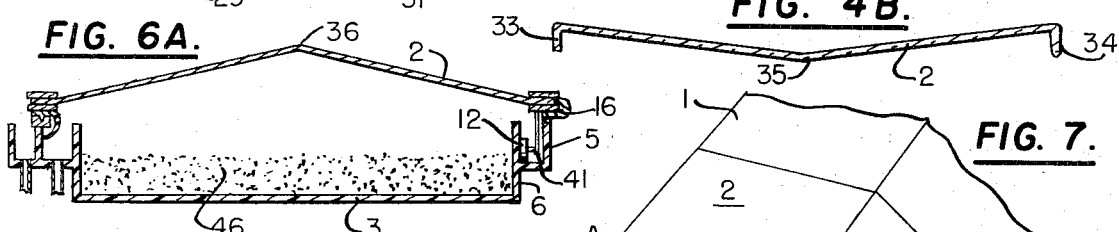
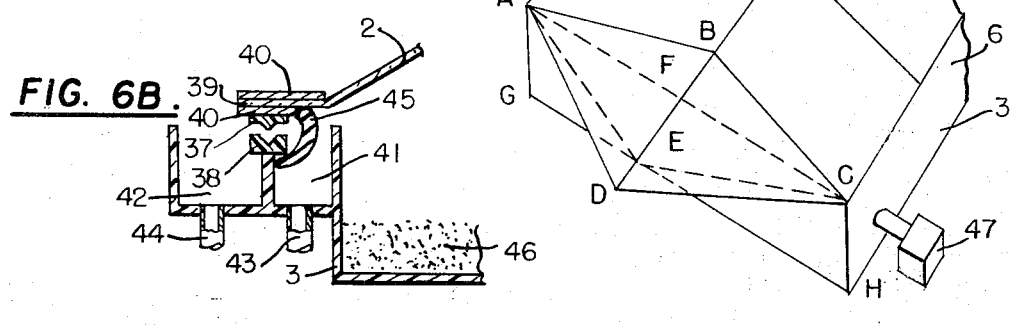

United States Patent Office 3,846,251
Patented Nov. 5, 1974

3,846,251
APPARATUS FOR SOLAR DISTILLATION
Harold R. Hay, Menlo Park, Calif.
(2424 Wilshire Blvd., Los Angeles, Calif. 90057)
Filed Mar. 2, 1971, Ser. No. 120,183
Int. Cl. B01d 3/00
U.S. Cl. 202—234   15 Claims

ABSTRACT OF THE DISCLOSURE

The solar distillation apparatus has a cover readily movable or removable from a first position for distilling, condensing, and collecting liquid to a second position exposing the distilland basin and materials therein. Said materials may be liquids or solids, absorbent or non-absorbent, for aiding in the process or recovery of water from the atmosphere while the cover is in its first or second positions and in conjunction with natural or forced air movement.

This invention relates to means for moving and removing a solar still cover to expose the distilland basin and materials contained therein to ambient air to facilitate maintenance of the solar still and to recover water from the atmosphere. The invention also relates to new structural forms for the cover and for the distilland basin and new means for fastening the cover to the distilland basin. Moreover, it relates to a process in which the movement of natural or forced air over the distilland basin at nighttime results in the deposition of water subsequently recovered by solar distillation during the daytime.

It is an object of this invention to provide novel means for quickly mounting and dismounting a solar still cover, for moving said cover to facilitate maintenance of solar still components, for exposing the distilland basin and materials therein with minimum effort and loss of productivity, and for protecting said cover from damage.

It is an added object to preform rigid or semi-rigid materials into solar still components which serve a plurality of uses, reduce erection and maintenance time, and increase yield.

It is a further object to recover water from the atmosphere by use of a solar still with a movable cover, or with a movable wall portion, thereby allowing natural flow of highly humid air to displace air of lower humidity, or by causing such displacement by means forcing said highly humid air through a solar still.

All or any portion of these objects may be accomplished in the embodiments of this invention. Other objects of the present invention will become more apparent after reading the following disclosure taken in conjunction with the drawings. It is understood that the drawings are for purpose of illustration only, and are not to be construed as defining the limits of the invention, reference being made to the appended claims for that purpose.

FIG. 1 is a fragmentary perspective and cross section representation of a solar still having a suspended condensate collector and means for readily moving and removing the cover and means for protecting the cover.

FIG. 2 is a fragmentary cross section representation of a means for quickly engaging and disengaging a solar still cover; shown in dotted lines is an optional means for securing a cover-protecting device over said cover.

FIG. 3 is a fragmentary cross section representation of a means for moving a solar still cover on a trackway.

FIG. 4a is a cross section representation of the assembly of a solar still cover and means for fastening said cover to a distilland basin; FIG. 4b is a cross section representation of a glass cover suitably formed for mounting in the distilland basin of FIG. 4a.

FIG. 5 is a top view representation of a distilland basin preformed with bottom corrugations which direct distilland flow and collect condensate.

FIG. 6a is a cross section representation of a glass-covered solar still with the cover made movable over a distilland basin formed integrally with a trackway and means for collecting distillate and rain; a granular material for recovery of water from atmosphere is shown in the distilland basin. FIG. 6b is an enlarged portion of FIG. 6a.

FIG. 7 is a fragmentary, top perspective representation of a solar still with alternative means for causing external air to displace air within the still.

The solar distillation art is now well known but of limited use owing to several shortcomings. Prior to the present invention, distillation means lacked convenience and involved excessive expense to install the still cover and to remove it for purposes of cleaning or repairing still components such as distilland basin or liner, insulation, evaporating surfaces such as wicks, distilland inlet and outlet, or condensate collecting troughs any of which may be components used in conjunction with other components in the embodiments of this invention described and illustrated in relation to horizontal stills but understood to be equally applicable and claimed equally for inclined stills. Moreover, glass covers have proved susceptible to breakage during transport, erection and use; falling shards have damaged still liners. Fragility and weight of glass have dictated use of small panes requiring many vapor seals and making it difficult to uncover large areas for access to the still basin. Plastic covers are also subject to wind and descending-object damage and may require patching. Out of service time for such maintenance should be minimized.

In prior art, distilland has been in the form of saline or brackish ground water, damp ground or plant materials, or water extracted from the air by absorbent materials moved into the still for recovery of absorbed water. Solar still covers are used as rain collectors. Under adverse conditions, all available sources of water must be utilized hence the still should be capable of combining many ways to collect and recover water.

For purposes of understanding better the disclosures and claims, certain terms will be defined. Within the meaning of this invention, water is one of a class of liquids to which the claims apply; alcohol and other liquids vaporizable by solar energy are within this class of liquids. A radiation-transmitting cover is understood to be one transparent, or translucent to solar rays and capable of transmitting energy derived therefrom to convert distilland to vapors condensed on said cover in most embodiments disclosed but which may be condensed elsewhere as described in prior art. A distilland-retaining component is understood to be any material usually tending to retain distilland under the still cover during distillation; it may be: the still basin or liner; an evaporative wick; a bed of inert material such as sand; a hygroscopic inorganic material such as a salt or salt solution; a hygroscopic organic material such as glycerine or plant materials; silica gel or similar sorptive materials; or it may be a combination of these and in any case preferably black or blackened on the surface.

Also for clarification, a flexible cover is understood to be a pliable film such as 4 mil polyvinylfluoride or other plastic films suitable for the solar distillation art, whereas rigid covers include glass and methylmethacrylate or other polymers usable as a substitute for glass. While usually the whole component to be described should be formed or made operative in the manner described and so used in any part of the still where said component appears, in some cases it may be advantageous for the improvement to be applied only in part to the component. Other terms will be made clear in the disclosure of the various embodiments of this invention.

In FIG. 1, the embodiment of my invention is a solar still with a flexible cover 2 mounted over a liquid and vapor impermeable bottom 3 confining liquid distilland 4. A trackway 5, associated with sidewall 6 of basin 3, is preferably an integral part of the sidewall but may be separate and attached thereto by means not shown. As better seen in FIG. 3 taken in conjunction with FIG. 1, a projecting lip 7 on sidewall 6 overlies and engages a projection 8 on elongated transport member 9 to check vertical lift of said transport member to which is fastened shaft 10 on which are mounted a thrust-absorbing device shown as wheel 11 and a transport means shown as wheel 12 inside trackway 5 to facilitate moving transport member 9. A cord 13, shown in FIG. 1 affixed to metal tab 14 fastened to transport member 9 provides one means for moving the transport member in the trackway. Transport member 9 also has projection 15 shown fitted with flexible sliding-seal 16 which contacts sidewall 6 to retard vapor loss from inside still 1.

The means for fastening flexible cover 2 to transport member 9, best shown in FIG. 3, consists of an elongated extension 17 on said transport member and having a recess in which cover 2 is held by suitable means such as compressible spline 18. FIG. 1 shows flexible cover 2 sloping from the fastening means 17 and 18 toward the center of the still owing to the weight of the suspended condensate collector 19 secured to the underside of cover 2 by spline 20 as described in my Pat. 3,314,862. Also extending from transport member 9, as shown in both FIGS. 1 and 3, is projection 21 representing a means for securing a screen 22 over cover 2 to prevent cover damage by stones, branches, or other descending objects. As shown, screen 22, which may be of fiberglass or metal mesh, is hooked onto projections 21.

As materials for the solar still embodiment of FIGS. 1 and 3, I prefer basin 3 to be vacuum-formed from black, ABS plastic with sidewalls 6, trackway 5, and hold-down lip 7 integrally a part thereof. Transport member 9, and its extensions and projections 8, 17, and 21, are best made from extruded aluminum with projections 21 shaped by transverse machining or sawing. Wheel shaft 10 is of suitable metal and wheels 11 and 12, as well as seals 16 and splines 18 and 20, may be of butyl rubber, plastic, or metal. For cover 2, I prefer polyvinylfluoride; to reduce wind flutter, I may apply strips of adhesive tape 23 or glass fiber tape in a manner dividing the cover into smaller "panes," thus dampening wind-caused cover flutter. The tapes 23 also absorb extra weight of very heavy rain or strong wind pressure. Other embodiments of my invention may be made of the materials mentioned above or as described later.

Another embodiment of my invention is illustrated in FIG. 2 wherein flexible cover 2 is secured in an elongated cover fastening means 24 shown with a cross section shape of an S though this may be varied as shown to the right of FIG. 4a. In FIG. 3, the spline 18 is shown in a conventional shape which does not protect cover 2 from abrasion by the cover fastener 17 or by a portion of the cover material clamped by said spline. To prevent abrasion resulting from movement of cover 2 under wind action, and to absorb varying tensions, I prefer to use a moderately soft spline with an extension 25 easily bent to provide a cushioning layer between cover 2 and either cover fastener 17 or cover material held in cover fastener 17 as shown in FIG. 2. Spline 18 with extension 25 may be extruded in the comma-shape illustrated, but this is more difficult to insert in cover fastener 17 so I prefer having tension on cover 2 serve, at least in part, to bend and form extension 25 of spline 18 into a cushioning layer.

Clamp 24 of FIG. 2 is a rigid cover-supporting member which may be hooked onto metal transport member extension 17 of FIG. 3 where spline 18 would then serve as a sealing means. This alternative and indirect way of fastening cover 2 to transport member 9 provides not only a movable cover but a removable one readily disengaged and replaced by a second cover with minimum effort and minimum interference with normal distillation in the solar still. By means of dotted lines, it is indicated that rigid cover supporting member 24 may be provided with projections 21 as means for securing a screen (not shown) over cover 2 in the manner described in relation to FIGS. 1 and 3. The use of cover-supporting member 24 will now be described in relation to another embodiment of my invention.

In FIG. 4a, a solar still is shown with various parts illustrated in assembly positions. Distilland basin 3 has sidewalls 6, projecting lips 7, and a centrally disposed condensate collecting trough 27 which may be separate from the bottom of said distilland basin but is shown as a part thereof. Cover 2 is shown fastened between two rigid cover supporting members 24 of the type in FIG. 2 including the part 21 dotted therein. Cover 2 is held in the recess of extension 17 by spline 18. When cover 2 is stretched taut between the two cover-supporting members, open-end clamping extensions 26 fit over lips 7 on sidewall 6 of basin 3 with just enough clearance for seal 16. At the left of FIG. 4a, seal 16 is shown as preformed and fitted onto lip 7; to the right, seal 16 is shown as a flat strip which will be forced into a shape comparable to the seal 16 at the left when the cover is in position. After cover 2 has been lowered and clamps 26 engage basin lips 7, a weighting means, which may be a metal rod or pipe, is centered on the upper surface of cover 2. This produces a downward force putting cover 2 in tension and causing it to assume the form shown by dotted lines. Cover tension draws clamping members 26 tight against compressing seals 16 on lips 7; this prevents vapor leakage along the edges of the cover. Weighting means 28 may be secured centrally over condensate-collecting trough 27 by cords (not shown) tied around said weighting means and projections 21. If desired, a protecting screen (not shown) may then be hooked onto projections 21.

FIG. 4a is shown with an inlet 29 for introducing distilland 4 into the still. In operation, radiant energy transmitted through cover 2 vaporizes distilland 4 which vapors condense on the underside of cover 2, preferably treated by well known means such as sandblasting to increase wettability, and condensate flows toward the low point of cover 2, under weighting means 28, from where it drips into condensate collecting trough 27 and is removed by conventional means not shown. The distillation process of FIG. 1 is identical except that condensate collected in suspended collector 19 is removed through tubing (not shown) slipped over the suspended collector.

When the cover 2 of FIG. 4a must be removed for access to distilland basin 3, weighting means 28 is lifted off cover 2, cover-supporting members 26 are moved outwardly and disengaged from lips 7 and the cover may be taken away after disengaging similar or other means for fastening the cover at the ends of the still. If the cover is removed for repair, a replacement can be quickly placed over the distilland basin 3 with only a few minutes loss of production.

In FIG. 1, the bottom of basin 3 is shown formed with three corrugations 30 rising to approximately the surface of distilland 4 and dividing the bottom of basin 3 into four portions or channels; either more or fewer dividing corrugations may be used. One purpose of corrugations 30 is to add extra rigidity to basin 3 formed of semi-rigid plastic, metal, or other materials and not uniformly supported below. A second purpose for corrugations 30 is to form end-around baffles to direct distilland flow through a circuitous route between the inlet and outlet for distilland 4 in basin 3.

In FIG. 5, a top view of a distilland basin similar to that of FIG. 1 shows distilland entering inlet 29 must follow the course indicated by arrows in passage to outlet 31. Stiffening corrugation 27 is in the form of a condensate-collecting trough similar to that marked 27 in FIG. 4a and, like corrugations 30 directing distilland flow in an end-around path. Baffling means such as the corrugations are important when flushing distilland through the still basin 3 to remove concentrated distilland which might deposit salts. It is generally advantageous to have distilland inlet 29 and outlet 31 near one another for easy observation of flow. End-around baffles are conventional for other hydraulic flow purposes but have not previously been used in the manner disclosed here—particularly where a centrally disposed condensate collector forms one of the baffles.

FIG. 5 also shows trackway 5 extending beyond still end 32 in a manner permitting a cover mounted in the movable manner of the embodiment of FIG. 1 to be positioned over distilland basin 3 during a first period of distillation and permitting it to be moved to a second position other than over a portion of distilland basin 3 during a second period when access to said portion is needed for cleaning or other maintenance purposes.

Having described means for quickly moving and removing flexible solar still covers, I shall now disclose novel means for accomplishing the same results with glass or other rigid or semi-rigid covers. FIG. 4b represents a readily removable glass cover 2 formed into a low-V shape with vertical projections 33 and 34 which need not necessarily be vertical nor shaped as shown for the embodiment to be described. Sheet glass may be cut to desirable sizes and formed in the shape shown by resting the cut pieces on suitable molds, heating the glass to the softening point, allowing gravity to form the pieces, and passing the formed glass through an annealing and cooling means. The first advantage of the shaped glass is the elimination of a seal along the centerline indicated as the low-point 35. The cover 2 of FIG. 4b can also be placed directly onto a distilland basin such as 3 of FIG. 4a instead of the flexible cover shown associated therewith. Vapors condensing on glass cover 2 of FIG. 4b then drip into one condensate-collecting trough 27 instead of requiring two troughs as do glass covers of conventional types such as the ridge or "greenhouse" types of FIGS. 6 and 7.

The weight of glass cover 2 of FIG. 4b causes a good vapor seal with soft seals of the type of 16 of FIG. 4a used in conjunction with the sidewalls of basin 3 thereof. As a precaution against wind lift, an adhesive, such as silicone or butyl rubber cement, may be used to hold the cover in place or suitable clamping means may be employed. This embodiment withstands downward thrusting wind pressures such as have caused failures of glass covers sealed with silicone at ridges such as 36 of FIG. 6. The V cover also simplifies collection of rain drained to a single collection point rather than two as required for cover 2 of FIG. 6.

In one embodiment of this invention, removable glass cover 2 of FIG. 4b with projections 33 and 34 is substituted for flexible cover 2 of FIGS. 1 and 3 preferably using splines 18 of the form shown in FIG. 2 as a sealing means. In this instance, it is preferred that the spline be preformed in the shape of a comma or serving in the same manner. By means of this embodiment, a movable glass cover functions in the way and for the purposes described for flexible cover 2 of FIG. 1, it being understood that a suitable condensate collector such as 27 of FIG. 4a is provided.

In still another embodiment, glass cover 2 of FIG. 4b, or a glass cover of other shape adapted by appropriate means, is added over flexible cover 2 of FIG. 1 with a spacer, such as seal 16 shown to the right of FIG. 4a, between the two covers at locations corresponding to those overlying recesses of cover supporting members 17. By having the slope of the glass cover less than that of the flexible cover, a substantial air space is formed between the two covers to act, as indicated by prior art, in a manner producing higher yields. Multiple covers have hitherto been of the same material; in this embodiment they are of different materials and different form with good purpose. The upper rigid cover absorbs wind pressures which would otherwise cause stress and flutter on a flexible cover resulting in shorter life and lower yields. Thus protected, the flexible cover may be much thinner and less costly. The flexible cover should be provided with a condensate-collecting trough such as indicated in FIGS. 1 or 4; the weighting means may be made very light since its purpose no longer includes stabilizing the flexible cover against wind effects.

In another embodiment applying a glass cover over a flexible cover, the cover of FIG. 4b is made of two panes of glass joined by a flexible sealant at the location 35. When this cover is of proper length and is placed over flexible cover 2 of FIG. 4a with a spacer between the covers above recesses in cover fastening means 17, the weight of the glass is transferred to the flexible cover at a point overlying the condensate collector 27 thus making unnecessary the use of an otherwise non-functional weighting means such as metal rod 28. In this embodiment it may not be possible to reduce the thickness of the flexible cover 2 as much as in the preceding embodiment but the flexible cover is substantially relieved of wind flutter.

In the embodiment of this invention illustrated in FIG. 6a, a readily movable rigid cover 2, shown on the right side as mounted on wheels 12 moving in trackway 5 associated with sidewall 6 of basin 3, drains condensate into the trackway which then serves as condensate collector 41. On the left of this figure and better shown in enlargement thereof in FIG. 6b, the rigid cover is shown mounted with a knife-edge 37 of plastic capable of moving in a runner 38 also shown as plastic but preferably of a different kind to reduce sliding friction as is well known in the art. Glass cover 2 is shown as preformed with a low ridge requiring no sealant along ridge 36 and with horizontally extending flanges 39 held in a suitable clamping means 40 which also holds sliding seal 16 and to which may be secured the wheel assembly 12 or the knife edge member 37. Runner 38 is mounted on an appropriate part of the condensate-collecting trough 41. An outlet 42 is shown for removing condensate from troughs 41.

As best seen in FIG. 6b, this embodiment may have a rain-collecting trough 42 having a common wall with collecting trough 41 and capable of receiving rain from cover 2 and having an outlet 44. The condensate and rain-collecting troughs of this embodiment may be separate from each other and from basin 3 but associated and sometimes fastened together with adhesives or other fastening means, to serve in the manner of my illustrated and preferred integrated form.

While the knife edge and runner assembly of FIG. 6b forms a vapor seal and also causes condensate to drain into collector 41, irregular wear or particles of foreign matter may diminish the effectiveness of this seal, hence a separate seal 45 is shown clamped by clamping device 40. The projection 34 on glass cover 2 of FIG. 4b is shown in the form of a knife edge which permits said cover to move directly in a runner such as 38 of FIG. 6b. Glass "knife edge" 34 should not be so sharp as to cut into runner 38. As the cases of FIGS. 1 and 4, provision can be made to assure that rigid cover 2 of FIGS. 4b and 6a cannot be lifted out of position by wind. In this embodiment, it is evident that a portion 34 of the glass cover 2 has become a transport member comparable to the transport member 9 of FIG. 1. Though not shown in FIGS. 6a and 6b, it is understood that cover-clamping member 40 may have an extension interlocking with the projecting shoulder of trackway 38, or other means to prevent the cover from being lifted out of the trackway by high winds.

Sealing means 16 and 24 of FIG. 4a, glass cover projections 33 and 34 of FIG. 4b, and transport means 12 and 37 associated with the trackways 5 and 38 of FIGS. 6a and 6b are shown asymmetrical for purposes of illustrating that the embodiments of this invention are not restricted to specific shapes or means but may be varied or used in different combinations. Similarly, it is understood that the interlocking engagement means for readily removing cover 2 from basin 3 of FIG. 4a may be applied along only one side or to a portion of one or more sides whereby it facilitates access to the contents of the still basin.

A characteristic or the polyvinylfluoride cover is that the original film is largely amorphous, but gradual aging, and more particularly mechanical stresses, cause the plastic to become more crystalline whereupon it loses excellent strength qualities. Three means have been described for reducing damage resulting from wind flutter: a suspended collector 19 of FIG. 1 or central weighting means 28 of FIG. 4a reduce the cover span of flexible material; paneling strips 23 of FIG. 1 acts in the same way and carries some of the cover load; and cushioning device 25 of FIG. 2 absorbs stress and cover movement without causing abrasion and crystallization. I shall now describe means for reducing strength loss caused by treatments required to make the plastic cover more wettable.

For a permanent effect, wettability of plastic covers is best accomplished by chemical treatments or mechanical abrasion methods which generally increase crystallinity and weaken strength properties. Any unnecessary crystallinity shortens the life of the cover, especially at points of cover fastening. Therefore, I have found it desirable to limit the wettability treatment to cover areas intermediate the cover-fastening or cover-supporting means and have found that this can be done without loss of condensate.

As shown in FIG. 1, the wettability treatment is confined to the cover portions between A and B; that is, between cover-supporting members 17 and the cover-fastening portion of condensate collector 19. All cover material contacting any of the rigid materials, splines, or other cover-fastening means should preferably be left untreated though advantage will be had if even a portion of the cover contacting such means is left untreated. Cover treatment preferably begins a short distance from such cover-fastening means; if this distance is not more than about one-fourth inch, there will be little or no drop formation of condensate near the cover-supporting means such as 17 of FIG. 1; drops formed near condensate collecting trough 19 drip into the underlying collecting troughs. The same result is obtained if, instead of the combined weighting and condensate collector means 19 of FIG. 1, a weighting means 28 of FIG. 4a is used over the cover in combination with a separate condensate collector 27. In this case, the weighting means 28 may be regarded as a cover-fastening means because it shapes and stabilizes the cover.

As an added advantage of my readily movable and removable cover, I have found that the solar still becomes an effective means for collecting moisture from the air. It is apparent from FIGS. 1 and 5 that moving the cover from a first position overlying a distilland-retaining component, such as basin 3, to a position not overlying said basin doubles the area of dew collection. Dew collected over the cover and drained into distilland basin 3, as well as that collected in said basin, will be contaminated with dirt. Thus, there is value in distilling it in the daytime when the cover has been returned to its first position. It is to be understood that dew collection is not extraction of water from the air; it would occur on any non-absorbant surface having similar thermal properties and is the result of a temperature effect. The recovery of the dew by solar distillation is no more the drying of a material than the distillation of a saline distilland. The collection and distillation of dew is of particular advantage in arid regions of high nighttime humidity but with scarce rain or ground water sources—regions such as high altitude or coastal deserts. The same dew collection and recovery would result if distilland basin 3 contains a wicking material as an evaporative surface, or a layer of inert sand which may be the second distilland-retaining component 46 of FIG. 6a.

If the distilland basin 3 of FIGS. 1 or 4a retain throughout the night some distilland from ground water source as a second distilland-retaining component within the definition of this invention, dew will deposit on this distilland surface because it is cooled by radiation to the night sky several degrees below air temperature. If the distilland is fairly concentrated brine, it may have a secondary moisture-extracting effect as would residual salts left as the second distilland-retaining component in a still from which all distilland was evaporated during the day.

I do not claim the process of extracting water from the air by means of hygroscopic materials such as glycerine or cellulose; nor by inorganic materials such as silica gel. Nor do I claim the recovery of water from such materials by solar distillation because this, too, is a part of prior art. I do claim that the movable and removable cover embodiments of this invention causes these materials to be used more efficiently. Moreover, I claim the process for increasing the efficiency of a solar distillation recovery of distilland obtained by dew collection through the use of a movable or removable cover. In this process, I expose one or more distilland-retaining components to the night sky for purposes of lowering their temperature below that which would be obtained if the cover were to remain overlying said components. Thus, I am allowing the deposition of dew to occur in a more convenient area for recovery by solar distillation.

Whether air overlying the distilland-retaining component loses moisture by condensation or by absorption, its moisture content is lower than that more remote from said component. It is necessary, therefore, to displace the air of lower moisture concentration by air or higher moisture content to maximize yield. This I do by moving the cover from a first position overlying one or more distilland-retaining components to allow natural air flow, in the form of wind, to displace air of lower moisture content by air of higher moisture content.

In an embodiment of my invention, I may open one or more portions of the still other than the cover in a manner causing natural air flow to displace air underlying said cover and overlying a distilland-retaining component. The still is allowed to remain in this open condition several hours during the night—especially with the openings oriented to receive the prevailing winds. FIG. 7 shows this embodiment in part. The area bounded by letters ABCEA represents a portion of the end of the solar still opened to receive natural air flow by movement of the material closing the still when in this first position to a second position indicated by the letters. ABCDA. The moved portion becomes a wind trap more effective if the material at D is at a higher elevation than B. The still should have a similar opening at the opposing end to permit uninterrupted air flow; the fragmentary view in FIG. 7 may represent either end of the same still.

If the still end ABCDA is made of rigid materials with two movable portions bounded by ABD hinged along line AB and BCD hinged along line BC, they would overlap in their lowered position and should preferably have a sealing means (not shown) to prevent daytime vapor loss.

Means such as any conventional fastening device, possibly including a supporting means, could hold the movable portion in its second, nighttime position. If the raised portion ABCDA is a single piece of flexible material, such as a plastic film, it will take a folded form in the lowered first position. Means for securing the film in its first and second positions are not shown but are well known in the art of folding or collapsible devises. It is also clear that the solar still end bounded by ABCHGA may have a sliding door bounded by ACHG, or a pair of doors AFEG and FCHE, which may be the means for opening the end to permit displacement of air inside the still by air outside the still.

Natural wind velocity, even augmented by a deflector, may not always be adequate to produce optimum flow of air for nighttime moisture collection. For more certain movement of air, I may use an electric blower, or similar air-forcing means 47, to cause air to flow under cover 2 and over distilland basin 3 of the FIG. 7 still. The air may be forced into the still through the sidewall 6, through an end portion ABCHGA, or through cover 2. In prior art, air has been blown through a solar still during the daytime period of distillation to cause vapors to be swept from the still to a separate condensing means. At such a time, air outside the still has a lower moisture concentration than air within the still. Though this may be done with embodiments of the present invention, I claim only the step of forcing the air through the still during nighttime when the outside air has a higher moisture content than air within the still.

By causing natural or forced air to pass through a still at night, when climatic conditions are favorable, the collection of moisture may occur on all still components such as the under side or cover 2, the sidewalls and ends, and on one or more distilland-retaining components. Some dew also collects on the outside of cover 2 and of other portions of the still; provision can be made for collection of this dew in troughs also suited to collect rain. While interior moisture collection occurs without any special absorbent material present, the movable and removable covers greatly facilitates both the displacement of air overlying the distilland-retaining components and access to said components.

Although the embodiments of the invention illustrated in FIGS. 1 through 7 have been described with considerable particularity and other embodiments have also been generally referred to, it is expressly understood that the invention is not restricted thereto, as the essence of the disclosed invention is capable of receiving a variety of expressions which will readily suggest themselves to those skilled in the art. Obviously, changes may be made in the arrangement, proportion, and composition of certain parts and certain features may be used with other features without departing from the spirit of this invention. I do not wish, therefore, to be limited to the precise details of construction and operation set forth but desire to avail myself of all aspects within the scope of the appended claims.

What is claimed is:

1. An apparatus for the distillation of a liquid comprising a solar still having in combination one or more distilland-retaining components, a cover capable of transmitting radiant energy to convert distilland in said distilland-retaining component to vapor which is condensed to distilland which is collected, and the improvement which comprises:

(a) a rigid cover-supporting transport member which at least in part is adapted for moving said cover as a whole, and (b) at least one rigid trackway associated with a distilland-retaining component said trackway engaging said transport member in a manner which permits said member to be moved from a first position in which said cover overlies at least a portion of said distilland-retaining component to a second position exposing said portion to ambient overlying air and permitting the return of said member and said cover to said first position and (c) means for removing from said solar still the liquid condensate so as to maintain in a relatively water-free condition a direct downward bearing relationship between the rigid cover-supporting means and the rigid trackway.

2. The apparatus of Claim 1 in which said transport member is adapted to support a non-rigid cover.

3. The apparatus of Claim 1 in which said transport member is adapted to support a rigid cover.

4. The apparatus of Claim 1 in which said transport member is a portion of a glass cover.

5. The apparatus of Claim 1 in which means are provided on said transport member for securing a cover-protecting means which reduces damage from descending objects.

6. An apparatus for distillation of a liquid comprising a solar still having in combination a cover capable of transmitting radiant energy to convert distilland in at least one distilland-retaining component to vapor condensed to distillate and collected the improvements: (a) in which an integrally formed portion of at least one sidewall of said distilland-retaining component is a rigid trackway supporting a movable cover on which said vapors are condensed to a liquid, and (b) means for removing from said solar still the liquid condensate so as to maintain in a relatively water-free condition a direct downward bearing relationship between the movable cover and the rigid trackway.

7. The apparatus of Claim 6 in which said trackway forms at least a portion of a means for removing condensate.

8. The apparatus of Claim 6 in which said trackway forms at least a portion of a trough for the collection of rain.

9. An apparatus for the distillation of a liquid comprising a solar still having in combination one or more distilland-retaining components, a cover capable of transmitting radiant energy to convert distilland in said distilland-retaining component to vapor which is condensed to distillate which is collected, and the improvement which comprises:

(a) a rigid cover-supporting transport member associated with said cover and adapted for moving said cover, and (b) a rigid trackway associated with a distilland-retaining component said trackway directly supporting and interlocking said transport member in a manner which permits said member to be moved from a first position in which said cover overlies at least a portion of said distilland-retaining component to a second position exposing said portion to ambient overlying air and permitting the return of said member and said cover to said first position, and (c) means for removing from said solar still the liquid condensate so as to maintain in a relatively water-free condition a direct downward bearing relationship between the rigid cover-supporting transport member and the rigid trackway.

10. The apparatus of Claim 1 in which said transport member is adapted to support a rigid cover.

11. The apparatus of Claim 1 in which said transport member is a portion of a glass cover.

12. The apparatus of Claim 1 in which said transport member is adapted to support a non-rigid cover.

13. The apparatus of Claim 1 in which said transport member is moved by means which include a rolling member.

14. The apparatus of Claim 1 in which said transport member is moved by means which include a sliding member.

15. The apparatus of Claim 1 in which means are provided on said transport member for securing a cover-protecting mesh which reduces damage from descending objects.

References Cited

UNITED STATES PATENTS

| | | | |
|---|---|---|---|
| 3,653,150 | 4/1972 | Howard | 203—10 |
| 3,655,517 | 4/1972 | Hensley, et al. | 202—234 |
| 2,019,831 | 11/1935 | Ricardo | 47—17 |
| 3,314,862 | 4/1967 | Hay | 203—10 |
| 3,351,538 | 11/1967 | Andrassy | 203—10 X |
| 2,614,366 | 10/1952 | Fleklin | 47—17 X |
| 956,771 | 5/1910 | Kline | 47—17 |
| 549,656 | 11/1895 | Pickering | 47—17 |
| 3,004,543 | 10/1961 | Pinet | 47—17 X |
| 2,601,326 | 6/1952 | Rohs et al. | 47—31 X |

FOREIGN PATENTS

| | | | |
|---|---|---|---|
| 741,179 | 11/1955 | Great Britain | 47—17 |
| 621,166 | 4/1949 | Great Britain | 47—17 |

NORMAN YUDKOFF, Primary Examiner

D. EDWARDS, Assistant Examiner

U.S. Cl. X.R.

203—10, Dig. 1, 100